United States Patent
Johnston et al.

(10) Patent No.: US 10,819,856 B2
(45) Date of Patent: *Oct. 27, 2020

(54) SYSTEMS AND METHODS FOR IDENTIFYING VIRTUAL COMMUNICATION PLATFORM USERS

(71) Applicant: Level 3 Communications, LLC, Broomfield, CO (US)

(72) Inventors: Dana A. Johnston, Highlands Ranch, CO (US); Claudia M. Combellas, Centennial, CO (US); Adam C. Uzelac, Rochester, NY (US); Michael F. Robles, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,222

(22) Filed: Feb. 18, 2020

(65) Prior Publication Data

US 2020/0186650 A1    Jun. 11, 2020

Related U.S. Application Data

(63) Continuation of application No. 15/965,074, filed on Apr. 27, 2018, now Pat. No. 10,574,831.

(60) Provisional application No. 62/491,652, filed on Apr. 28, 2017.

(51) Int. Cl.
*H04M 7/00* (2006.01)
*H04M 7/12* (2006.01)

(52) U.S. Cl.
CPC ........... *H04M 7/121* (2013.01); *H04M 7/009* (2013.01); *H04M 7/125* (2013.01); *H04M 7/127* (2013.01)

(58) Field of Classification Search
USPC ......... 379/229, 230, 221.08, 221.09, 221.12, 379/221.13
See application file for complete search history.

(56) References Cited

U.S. PATENT DOCUMENTS

| | | |
|---|---|---|
| 6,542,475 B1 | 4/2003 | Bala |
| 8,467,354 B1 | 6/2013 | Jerkunica |
| 9,037,977 B1 | 5/2015 | Tovino |
| 2005/0047579 A1 | 3/2005 | Salame |
| 2005/0053053 A1 | 3/2005 | Smith |
| 2009/0086742 A1 | 4/2009 | Ghai |
| 2015/0079999 A1 | 3/2015 | Toker |
| 2016/0105552 A1 | 4/2016 | Lam |
| 2016/0277587 A1 | 9/2016 | Alexander |
| 2018/0316797 A1 | 11/2018 | Johnston et al. |

*Primary Examiner* — William J Deane, Jr.

(57) ABSTRACT

Methods for handling traffic between a first network including a virtual communication platform and a second network, such as a circuit-switched network, include inserting customer identifiers into data packets. For traffic sent to the second network, the packets with the identifiers are transmitted to a trunking service that uses the identifier to determine one or more applicable service attributes for handling the data contained within the packets. For data traffic received from the second network, the virtual communication platform uses the identifiers to determine a destination, such as an endpoint device, for the traffic within the first network.

20 Claims, 8 Drawing Sheets

SYSTEMS AND METHODS FOR IDENTIFYING VIRTUAL COMMUNICATION PLATFORM USERS

TECHNICAL FIELD

Aspects of the present disclosure involve managing call traffic when the originator of the call may not be known or readily discernible. More specifically, aspects of the present disclosure involve managing traffic between virtual communication platforms, such as cloud-based private branch exchanges, and other networks including public switched telephone networks.

BACKGROUND

A private branch exchange (PBX) is a private telephone exchange or switching system that may be implemented within an enterprise. The PBX enables internal phone calls to be routed within the PBX while routing external phone calls to a reduced set of external lines, thereby reducing telephony costs for the enterprise. PBX systems also enable customization of the internal phone network to best suit the needs of the enterprise such as by modifying the PBX with one or more modules that provide additional telephony functionality such as voicemail, conference calling, call waiting, and the like.

Many PBX systems communicate using internet protocol (IP) and session initiation protocol (SIP). As a result, such PBX systems typically require gateways or similar equipment to facilitate communication between the internal IP-based network of the enterprise and legacy telephone networks, such as the public switched telephone network (PSTN). Through a process referred to as "trunking", traffic to and from lines of the PBX are consolidated onto a virtual connection, which may be over the Internet or a virtual private network (VPN), and communicated between a trunking service provider and the PBX system. Accordingly, externally directed traffic originating from endpoint client devices of a PBX system is consolidated onto the virtual connection and transmitted to the trunking service provider, which then performs the necessary conversion of the IP-based traffic to signals compatible with the PSTN. Similarly, the trunking service provider converts signals from the PSTN into IP-based traffic and consolidates the IP-based traffic onto the virtual connection for transmission to the PBX system. The PBX system then routes the traffic as necessary to one or more endpoint client devices.

It is with these observations in mind, among others, that aspects of the present disclosure were conceived.

SUMMARY

In one aspect of the present disclosure, a method of transferring traffic between networks is provided. The method includes receiving a packet from a first network element of a first network, the packet including data originating from a second network element communicatively coupled to the first network element. The packet further includes an identifier associated with the second network element inserted into the packet by the first network element. The method further includes identifying a service attribute associated with the second network element based on the identifier, converting the data for transmission over a second network, and transmitting the converted data over the second network in accordance with the service attribute. The first network element at least partially implements a virtual communication platform hosting a plurality of communication services. The plurality of communication services includes a communication service associated with the second network element and through which the data originating from the second network is received by the virtual communication platform.

In another aspect of the present disclosure, another method of transferring traffic between networks is provided. The method includes receiving, at a first network element, a telecommunications signal including a destination identifier corresponding to a second network element. An identifier corresponding to the second network element is then retrieved based on the destination identifier. A packet is generated from the signal and the identifier is inserted into the packet. The packet, which includes the identifier, is then transmitted to a third network element communicatively coupled to the second network element. The third network element at least partially implements a virtual communication platform hosting a plurality of communication services. The plurality of communication services includes a communication service associated with the second network element through which communications received by the virtual communication platform are provided to the second network element.

In still another aspect of the present disclosure, a system for transferring traffic between networks is provided. The system includes a first network element communicatively coupleable to a second network element over a first network, the first network element including one or more processors in communication with one or more memories. The one or more memories include instructions that, when executed by the one or more processors, cause the one or more processors to receive a packet from the second network element, the packet including data originating from a third network element communicatively coupled to the second network element and an identifier associated with the third network element inserted into the packet by the second network element. The instructions further cause the processor to identify a service attribute associated with the third network element based on the identifier, convert the data for transmission over a second network, and transmit the converted data over the second network in accordance with the service attribute. The second network element at least partially implements a virtual communication platform hosting a plurality of communication services, the plurality of communication services including a communication service associated with the third network element and through which the data originating from the third network is received by the virtual communication platform.

In yet another aspect of the present disclosure, another system for transferring traffic between networks is provided. The system includes a first network element communicatively coupleable to a second network element that at least partially implements a virtual communication platform. The first network element includes one or more processors in communication with one or more memories, the one or more memories storing instructions executable by the one or more processors. When executed by the one or more processors, the instructions cause the one or more processors to receive a telecommunications signal including a destination identifier corresponding to a third network element associated with a communication service and to retrieve, based on the destination identifier, an identifier corresponding to the third network element. The instructions further cause the one or more processors to generate a packet from the signal, insert the identifier into the packet, and transmit the second packet including the identifier to the second network element. The communication service associated with the third network element is one of a plurality of communication services hosted by the virtual communication platform.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
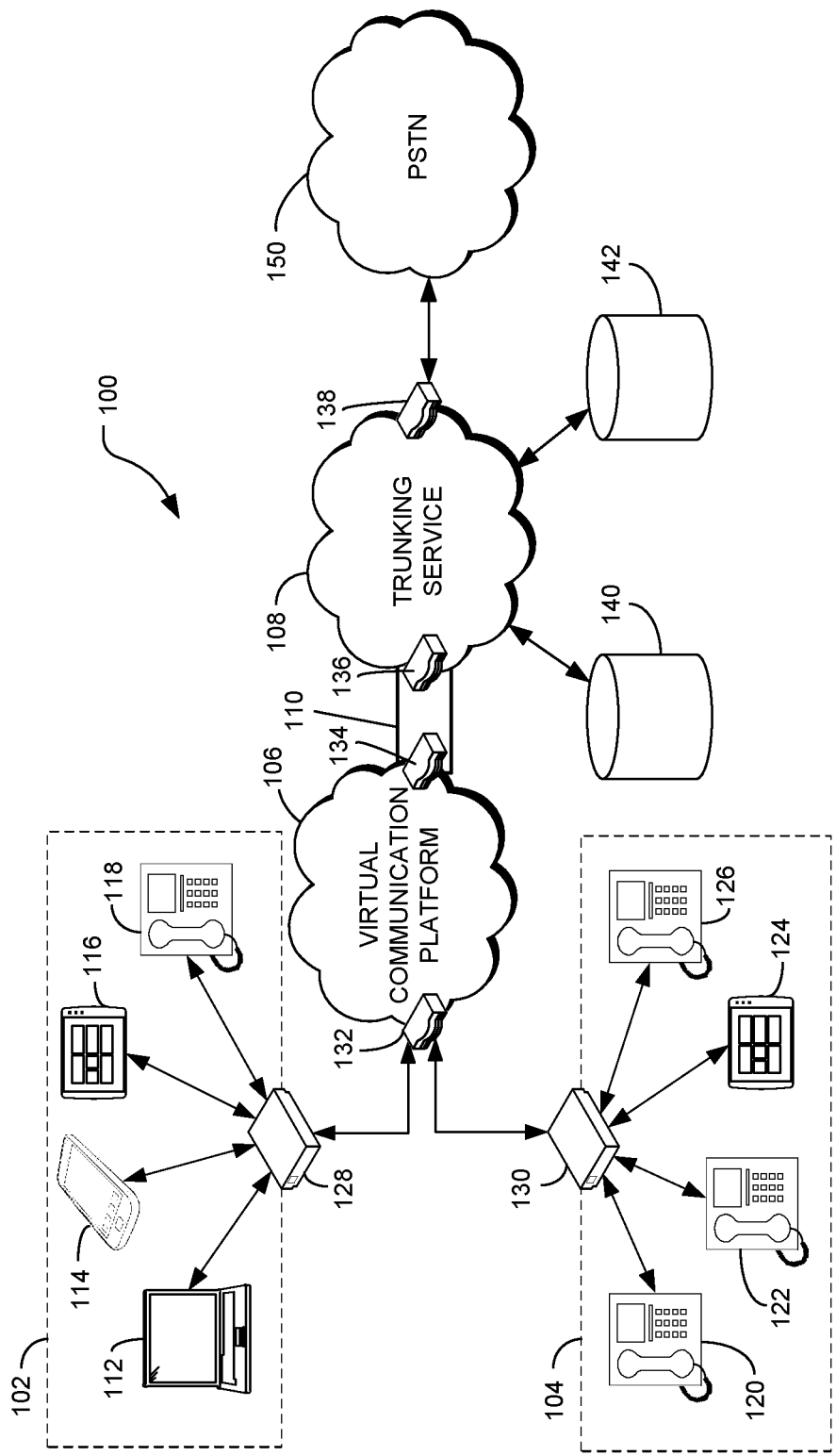
FIG. 1 is a schematic illustration of an example network environment for handling traffic between a virtual communication platform and a public switched telephone network (PSTN).

Many conventional PBX systems require enterprises to deploy one or more PBX servers, which use a broadband modem to connect to a session border controller, gateway, or other network equipment of a trunking service. However, in light of the costs and general inefficiency of enterprises maintaining their own PBX systems, much functionality of traditional PBX systems is available over the Internet through third-party providers. Such virtual communication platforms may include telephony functionality of PBX systems, as well as broader functionality of unified communications and collaboration platforms including, without limitation, instant messaging, presence information, voice, video, mobility features, conferencing, desktop sharing, and the like.

In such virtual PBX platforms, a host system communicates with endpoint client devices of a customer enterprise over the Internet or a virtual private network (VPN). Similar to conventional PBX systems, traffic within an enterprise is handled primarily by the virtual communication platform, which makes connections, routes traffic, and otherwise facilitates communication between endpoint client devices. However, communication outside of the enterprise and, in particular communication that requires use of the public switched telephone network (PSTN) or similar networks, still requires the use of a trunk between the host system of the virtual communication platform and a trunking service provider to consolidate and transmit IP-based data to the trunking service provider. The trunking service provider may then convert the IP-based traffic into a signal or format suitable for communication over the PSTN or other network. A similar process operates in reverse for traffic received by the trunking service provider over the PSTN and intended for a network device of the virtual PBX system.

Many PBX servers are connected directly to trunking service providers and with each PBX server being readily identifiable by a public IP address or a combination of a VPN identifier and private network address within the VPN. Identification of the customer enterprise from which traffic originates is useful in ensuring that the traffic is handled by the trunking service provider appropriately and often according to a service contract between the customer enterprise and the trunking service provider. Such contracts may dictate the number of lines available to a customer enterprise, billing terms, quality of service (QoS) requirements, and other attributes of the trunking service. Moreover, being able to identify and monitor the source of particular traffic enables trunking service providers to evaluate the health and performance of their networks and to inform maintenance, capital improvement, and other strategic business decisions.

Virtual communication platforms, such as cloud-based PBX platforms, typically preclude the use of an IP address to identify a customer enterprise. Specifically, the trunking service provider equipment is generally only aware of the IP address of the virtual communication platform from which the network elements of the trunk provider receive the traffic. Because virtual communication platforms may handle traffic from multiple customer enterprises of the trunking service provider, the IP address of the virtual communication platform does not reliably indicate the originating source of particular traffic. Stated differently, it can be challenging to identify the customer originating the traffic and to subsequently manage the traffic on a customer basis.

In light of the foregoing challenges, among others, systems and methods disclosed herein use customer identifiers to identify the customer enterprise associated with traffic handled by the trunking service provider. More specifically, customer identifiers are inserted into headers of session initiation protocol (SIP) or similar messages passed between the virtual communication platform and the trunking service provider. The customer identifier may then be used to perform a lookup and identify the specific customer enterprise associated with the message and corresponding traffic.

Although described below in more detail, systems and methods for handling traffic originating at an endpoint client device and then directed to a PSTN or other telecommunication platform include the endpoint device generating a packet and transmitting the packet to a network element, such as a session border controller, of a virtual communication platform. In one example, the virtual communication platform is a cloud-based PBX. In response to receiving the packet, the virtual communication platform retrieves a unique identifier associated with the endpoint client device or more generally the customer associated with the endpoint device, inserts the unique identifier into a header of the packet, which may be a SIP message, and forwards the packet to a session border controller or other network element of a trunking service provider. The network element of the trunking service provider then extracts the identifier from the header and then identifies the customer enterprise associated with the customer identifier and one or more attributes of a service provided by the trunking service provider to the customer enterprise. The network element of the trunking service provider then routes the traffic (or signals derived therefrom) over the PSTN or other telecommunication platform in accordance with the service attributes.

In the specific example of connecting with a PSTN, when receiving traffic from the PSTN that is destined for an endpoint client device of a customer enterprise, a signal is received by a network element of the trunking service provider from a telephony device of the PSTN. The signal generally includes or is preceded by a signal including a destination identifier, such as a phone number. The network element of the trunking service provider uses the destination identifier to perform a lookup and retrieve an identifier corresponding to the customer enterprise associated with the endpoint client device. The network element of the trunking service provider then generates a packet based on the received signal, inserts the identifier into the header of the packet, and transmits the packet to a network element of a virtual communication platform. The network element of the virtual communication platform may then extract the identifier, perform a lookup using the identifier to determine an address of the endpoint client device, and forward the packet to the endpoint client device according to the address.

For purposes of this disclosure, virtual PBX services, unified communications and collaboration services, and similar services are may be referred to generally as communications services. Accordingly, a virtual communication platform in the context of the present disclosure may host multiple communication services for use by respective enterprises, individuals, or other users. Although the present disclosure uses virtual PBX and unified communications and collaboration services as primary examples of communication services for which the present disclosure is applicable, the principles and concepts disclosed herein may be readily adapted to provide other virtualized communication services.

FIG. 1 is a schematic illustration of an example network environment 100 for processing telephone calls. In one implementation, each of a first customer network 102 and a second customer network 104 are connected to a virtual communication platform 106. The virtual communication platform 106 may include one or more network elements such as a session border controller, a gateway, a router or switch, and a server. Accordingly, reference to the virtual communication platform 106 should be understood to refer either to the virtual communication platform 106 as a whole or to one or more network elements contained within the virtual communication platform 106.

The first customer network 102 may include a plurality of first endpoint client devices or user agents, such as client endpoints devices 112-118, connected to the virtual communication platform 106 through a first customer network edge device 128. The first customer network edge device 128 is generally in communication with a first border function 132. Similarly, the second customer network may include a plurality of second endpoint client devices or user agents, such as client endpoint devices 120-126, connected to the virtual communication platform 106 through a second customer network edge device 130 and the first border function 132. The endpoint client devices 112-126 may include any telephony or computing devices capable of creating and receiving packets. For example, in certain implementations, each of the endpoint client devices 112-126 are a session initiation protocol (SIP)-enabled devices and may include, without limitation, one or more of a desktop telephone, a smartphone, a laptop computer, a desktop computer, and a tablet. The first border function 132 may include, without limitation, one or more of a modem, a session border controller, a gateway, or a similar device including hardware and software adapted to process traffic to and from the first and second customer networks 102, 104. The first border function 132 may further include functionality for encrypting and decrypting traffic handled by the first border function 132 and performing authentication of devices transmitting traffic to or receiving traffic from the first border function 132.

The virtual communication platform 106 may be connected to a trunking service provider 108 over a trunk 110, which may be a SIP trunk. The trunking service provider 108 may include one or more network elements such as, without limitation, one or more of a session border controller, a gateway, a router or switch, and a server. Accordingly, reference to the trunking service provider 108 should be understood to refer either to the trunking service provider 108 as a whole or to one or more network element contained within the trunking service provider 108. The trunk 110 is a virtual connection that may be established over the Internet or similar network and over which traffic between the virtual communication platform 106 and the trunking service provider 108 is consolidated. In certain implementations, the trunk 110 may extend between a border function 134 of the virtual communication platform 106 and a border function 136 of the trunking service provider. Similar to the border function 132, each of the border functions 134 and 136 may include, without limitation, one or more of a modem, a session border controller, a gateway, or similar devices including hardware or software adapted to process traffic between the virtual communication platform 106 and the trunking service provider 108. The trunking service provider 108 is further connected to a public switched telephone network (PSTN) 112 through another border function 138.

During operation, the virtual communication platform 106 receives packets from the endpoint client devices 112-126 corresponding to communications to be delivered over the PSTN 150. For example, the endpoint client devices 112-126 may be voice over Internet protocol (VoIP) devices and the packets transmitted to and from the endpoint client devices 112-126 may include encoded voice information related to a call between one or more of the endpoint client devices 112-126 and one or more telephone devices connected to the PSTN 150. The virtual communication platform 106 then transmits the packets to the trunking service provider 108 over the trunk 110. For example, when initiating a call or similar communication, one of the endpoint client devices 112-126 may generate a SIP request message and transmit the SIP request message to the virtual communication platform 106. In response to receiving a packet from one of the client devices 112-126, the virtual communication platform 106 performs a lookup using data contained within the packet to determine a unique identifier assigned to the customer enterprise to which the endpoint client device belongs. For example, in certain implementations, the virtual communication platform 106 may extract a source IP address from the packet and perform a lookup in a customer identifier database 140 that correlates IP addresses with customer identifiers. The lookup may also be performed using other identifying information such as including, without limitation, a VPN identifier and private network address. The virtual communication platform 106 then inserts the customer identifier into a header of the packet and transmits the packet to the trunking service provider 108 over the trunk 110.

The customer identifier may be in any form suitable for insertion into a packet provided it may be used to uniquely identify a particular customer enterprise. In certain implementations, the customer identifier may adhere to one or more standards. For example, the customer identifier may correspond to a trunk group identifier as published by the Internet Engineering Task Force (IETF®) in Request for Comment (RFC) 4904. In other implementations, the customer identifier may be inserted into standard fields of a packet. For example, in the context of SIP signaling, the outgoing trunk group (OTG), destination trunk group (DTG), or TRGP fields may be used to store the customer identifier. In still other implementations, domain name server (DNS) entries corresponding to separate IP addresses may be used as customer identifiers.

When the trunking service provider 108 receives a packet including a customer identifier, the trunking service provider 108 extracts the customer identifier from the packet header and performs a lookup to identify the corresponding customer enterprise and, more specifically, to identify attributes of services provided to the customer enterprise. For example, in certain implementations, the trunking service provider 108 may query the customer identifier database 140 to receive a name or other identifier of the customer enterprise that is then used to query a service database 142 that includes attributes of services provided by the trunking service provider 108 to customer enterprises. Alternatively, the service profile database 142 may include customer identifiers and may be queried directly by the trunking service provider 108.

After obtaining the relevant service attributes, the packet is processed in accordance with the service attributes by the trunking service provider 108. In general, the trunking service provider 108 will convert the packet to a signal compatible with a telecommunications network and transmit the signal to the appropriate destination. For example, if the trunking service provider 108 facilitates communication with the PSTN 150, the trunking service provider 108 may convert packets received form the virtual communication platform 106 into a PSTN-compatible signal, such as a signaling system number 7 (SS7) signal. In addition to signal transmission over the PSTN, the trunking service provider 108 may perform additional functions based on the service attributes. For example, the trunking service provider 108 may perform various functions specific to the customer enterprise and related to the terms of service as represented by the service attributes. Such functions may include, without limitation, one or more of billing functions, line usage tracking, bandwidth tracking, and quality of service (QoS) analysis.

For traffic originating from the PSTN 150, the trunking service provider 108 receives a signal destined for one of the endpoint client devices 112-126 or, in the case of a conference call or similar function, the virtual communication platform 106. Signals received from the PSTN 150 may include or may be preceded by one or more signals including a destination identifier, such as a phone number. In certain implementations, the trunking service provider 108 performs a lookup using the destination identifier to determine the customer identifier associated with the destination of the traffic from the PSTN 150. For example, the customer identifier database 140 may further include entries in which destination identifiers are correlated with corresponding customer identifiers such that the customer identifier may be obtained by performing a lookup using the destination identifier. The trunking service provider 108 may then generate a packet corresponding to the received signal and insert the customer identifier into a header of the packet before transmitting the packet to the virtual communication platform 106.

Figure 2A:
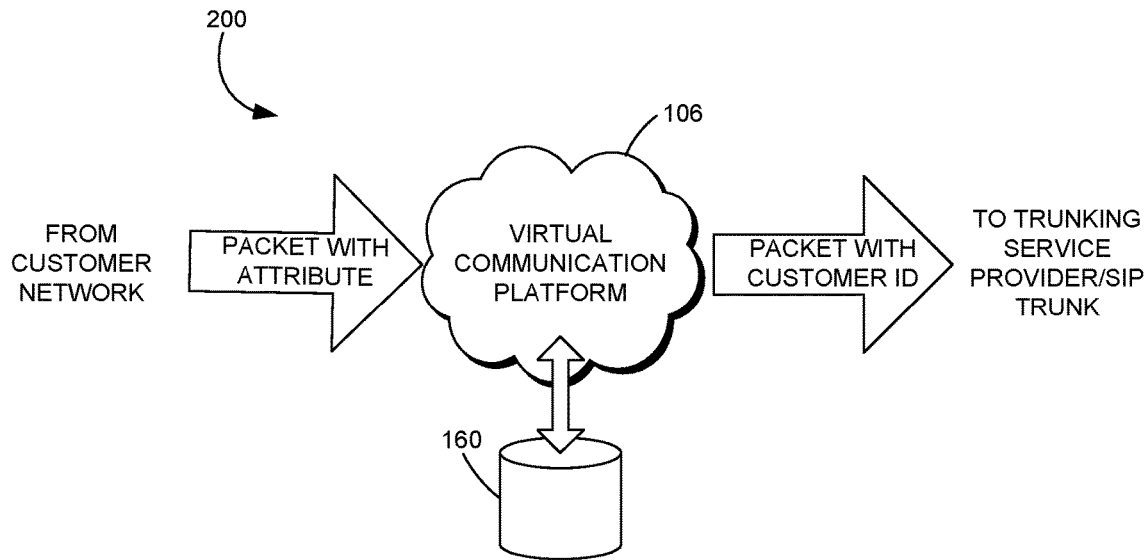
FIG. 2A is a schematic illustration of traffic flowing through a virtual communication platform of FIG. 1 toward the PSTN of FIG. 1.
Figure 2B:
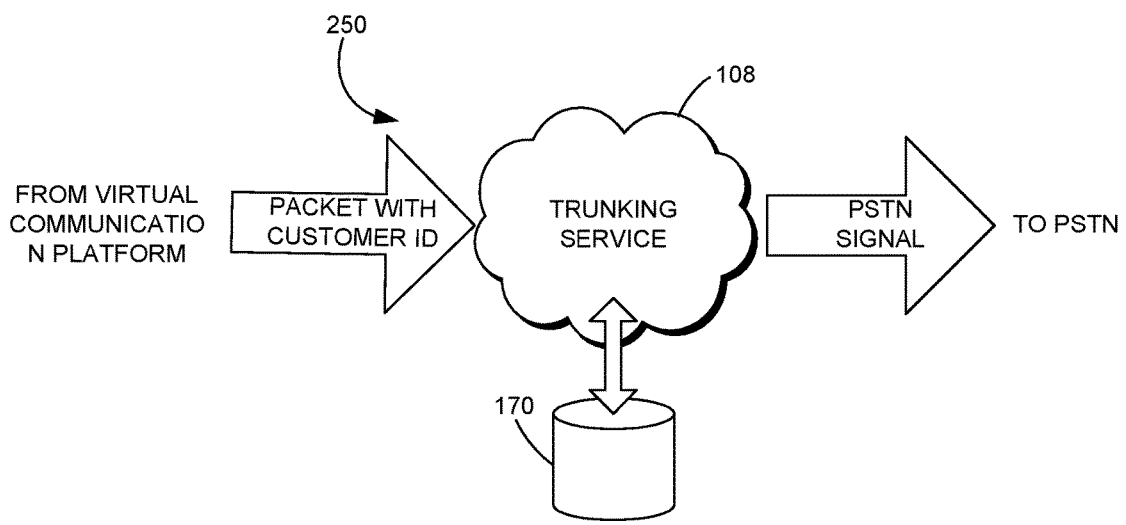
FIG. 2B is a schematic illustration of traffic flowing through a trunking service of FIG. 1 toward the PSTN of FIG. 1.

FIGS. 2A and 2B further illustrate transfer of traffic originating from a customer network, such as the customer networks 102, 104 of FIG. 1, and intended for delivery over a circuit-switched network, such as the PSTN 150, or other network. More specifically, FIG. 2A is a schematic illustration 200 of traffic sent from a customer network and being forwarded by the virtual communication platform 106 to the trunking service 108. FIG. 2B is a second schematic illustration 250 depicting the subsequent operations carried out by the trunking service 108 to deliver the data received from the virtual communication platform 106 to the PSTN 150 or similar network. The processes illustrated in FIGS. 2A and 2B are also represented in FIGS. 3A and 3B, which are flow charts illustrating corresponding methods 300 and 350.

Figure 3A:
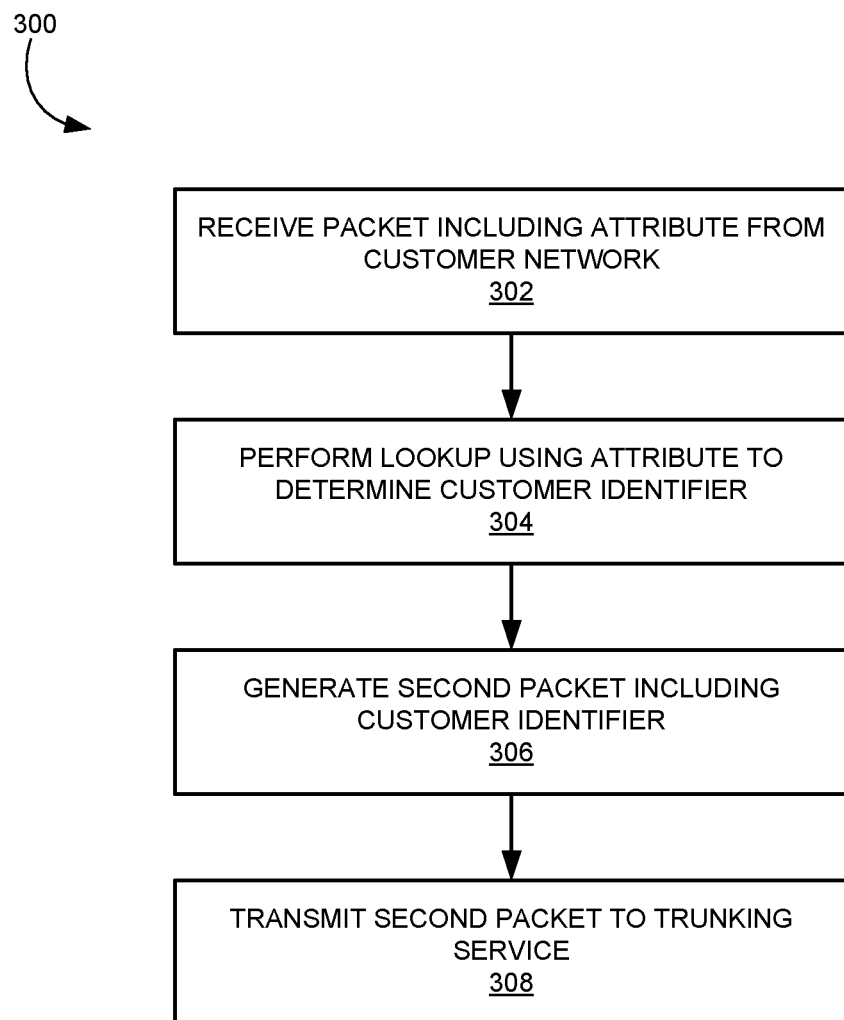
FIG. 3A is a flow chart illustrating a method for handling traffic using a virtual communication platform and corresponding to the schematic illustration of FIG. 2A.
Figure 3B:
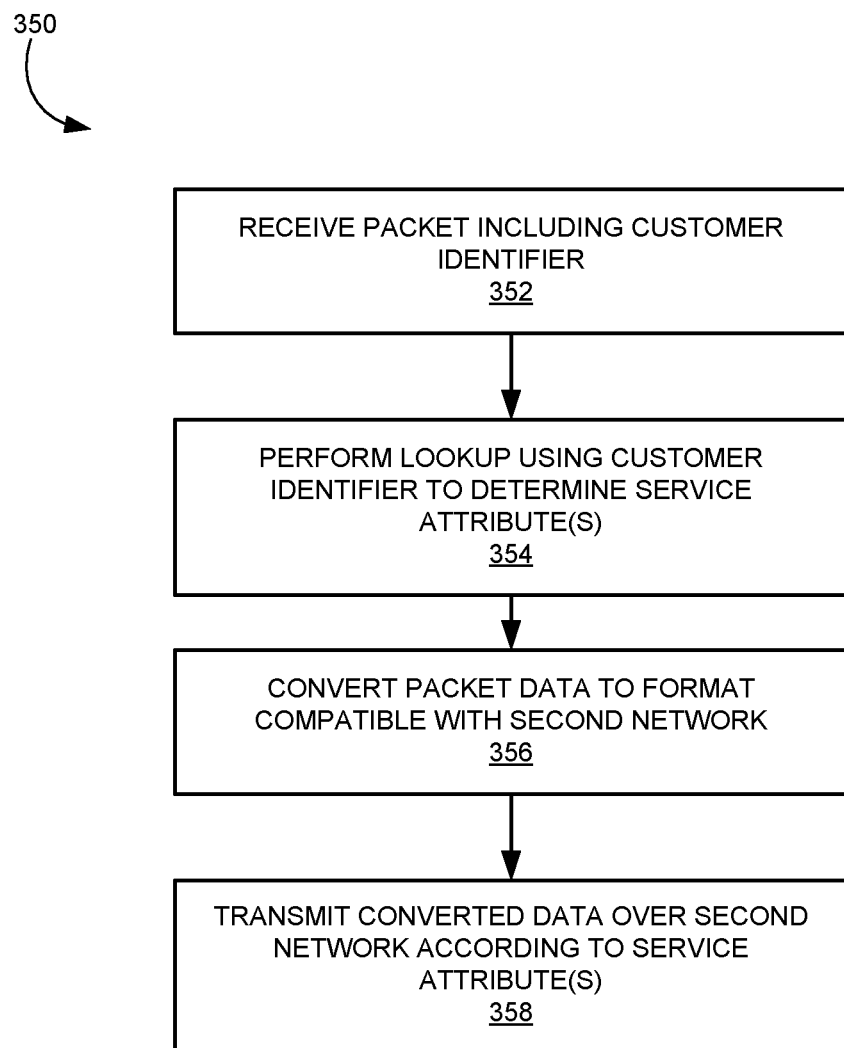
FIG. 3B is a flow chart illustrating a method for handling traffic using a trunking service and corresponding to the schematic illustration of FIG. 2B.

Reference is first made to FIGS. 1, 2A, and 3A to describe the process of handling traffic from a customer network, which is further illustrated by the method 300 of FIG. 3A. The process of handling traffic from a customer network, such as the customer network 102, begins at operation 302 with the virtual communication platform 106 receiving data from the customer network 102. For example, in certain implementations, the data received by the virtual communication platform may be in the form of a packet including voice or other communications data. The packet may further include one or more attributes or identifiers associated with the customer of the customer network 102. For example, in certain implementations, the packet may include, among other things, an Internet protocol (IP) address, an identifier associated with the customer network 102, or an identifier associated with one or more network elements of the customer network 102.

At operation 304, the virtual communication platform 106 performs a lookup or similar operation using the attribute of the packet to determine a customer identifier associated with the attribute. For example, in some implementations, the virtual communication platform 106 may be communicatively coupled to a customer data source 160 containing one or more tables or similar data structures that correlate attributes within packets to particular customers of the virtual communication platform and corresponding trunking services. One example of an attribute may be a public IP address. Another example of an attribute may be a combination of a VPN identifier and a private IP address.

At operation 306, the virtual communication platform 106 generates a second packet including the customer identifier determined in operation 304. Generating the second packet may include simply inserting the customer identifier into the packet received during operation 302 or may include generating an entirely new packet including the customer identifier. In certain implementations, the customer identifier is inserted by the virtual communication platform 106 into a header of the second packet.

At operation 308, the virtual communication platform 106 transmits the second packet to the trunking service 108.

Reference is next made to FIGS. 2B and 3B, the latter of which is a flow chart illustrating a method 350 for handling traffic received from the virtual communication platform 106 by the trunking service 108. At operation 352, the trunking service 108 receives a packet, such as the second packet described above in the context of FIGS. 2A and 3A, from the virtual communication platform 106. As previously discussed, such packets include data received from a customer network 102 as well as a customer identifier inserted into the packet by the virtual communication platform 106.

At operation 354, the trunking service 108 performs a lookup or similar operation using the customer identifier included in the packet to identify one or more service attributes. The service attributes are used by the trunking service 108 to determine parameters for how the traffic received from the virtual communication platform 106 is to be recorded, tracked, or otherwise handled. For example, in certain instances, a customer's voice services may be governed by each of a first services agreement with an operator of the virtual communication platform 106 and a second services agreement with an operator of the trunking service 108 and associated network. Accordingly, while the virtual communication platform 106 may handle voicemail, conference calling, or similar functions, traffic is ultimately handled by the network operator and governed by the agreement with between the customer and the network operator. Accordingly, data received from the customer and handled by the network operator, such as data received at the trunking service 108, must often be tracked or be subject to other terms of service. To facilitate such data handling, the service attribute may be used to, among other things, determine the particular parameters governing data handled by the network operator and to track data handled by the network operator. For example, the service attributes may corresponding to, but are not limited to, billing functions, line usage tracking functions, and quality of service functions. To facilitate identifying service attributes, the trunking service 108 may be communicatively coupled to a data source 170 that correlates a customer's customer identifier with service attributes for one or more services provided to the customer.

At operation 356, the trunking service 108 converts the packet to a format suitable for transmission over a second network. For example, in certain implementations, the trunking service 108 converts the data included in the packet to a format suitable for transmission over a circuit-switched network, such as the PSTN 150, or other network. At operation 508, the trunking service 108 transmits the converted data over the network in accordance with the service attribute.

Figure 4A:
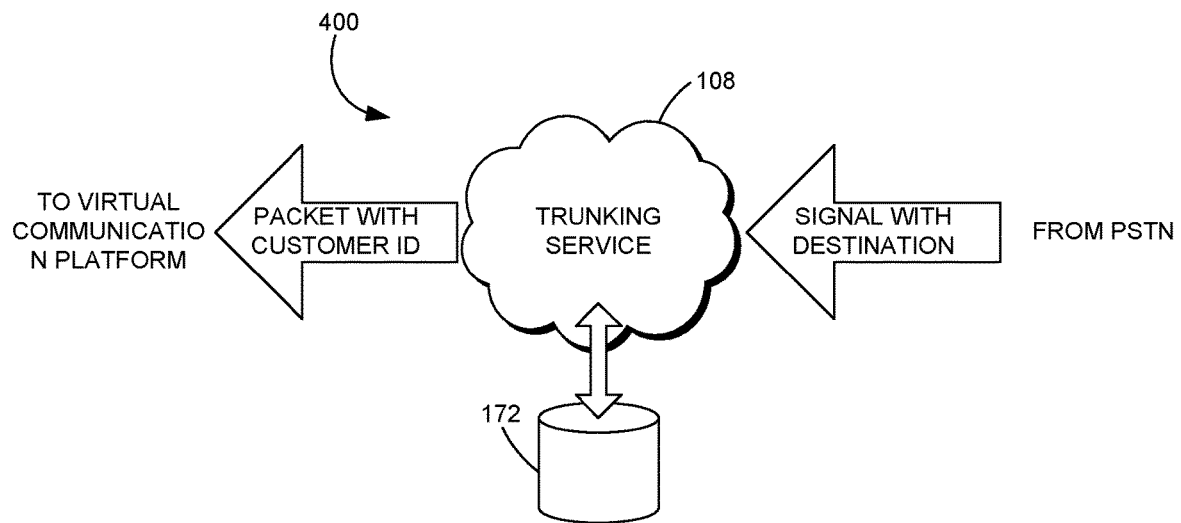
FIG. 4A is a schematic illustration of traffic flowing through the trunking service platform of FIG. 1 from the PSTN of FIG. 1.
Figure 4B:
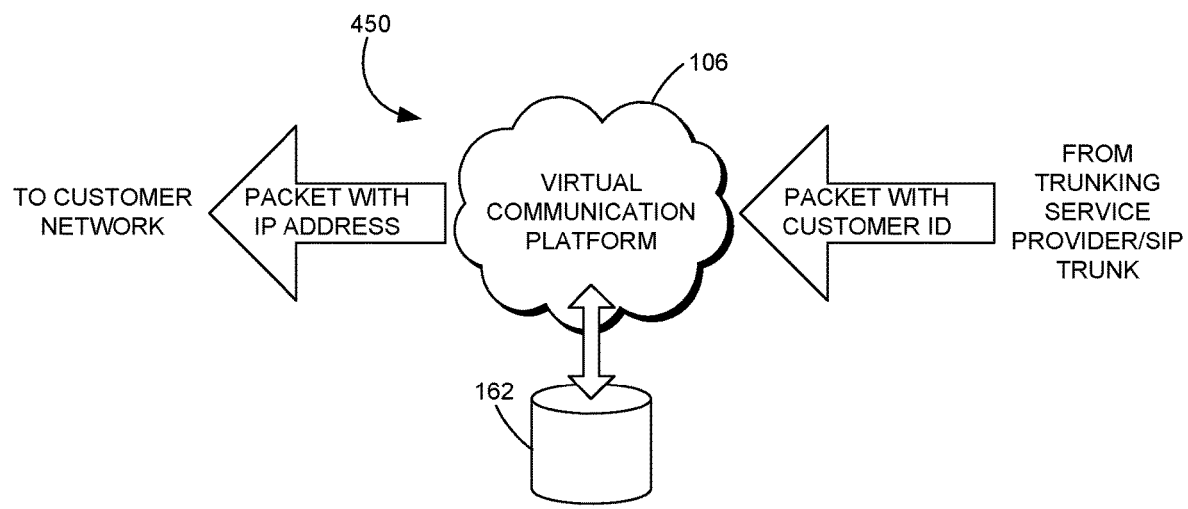
FIG. 4B is a schematic illustration of traffic flowing through the virtual communication platform of FIG. 1 from the PSTN of FIG. 1.

FIGS. 4A and 4B further illustrate transfer of traffic originating from a circuit-switched or other network, such as the PSTN 150 of FIG. 1, and intended for delivery to an endpoint device of a customer network, such as one of the endpoint devices 112-118 of the first customer networks 102 or the endpoint devices 120-126 of the second customer network 104. More specifically, FIG. 4A is a schematic illustration 400 of traffic sent from the PSTN 150 and being forwarded by the trunking service 108 to the virtual communication platform 106. FIG. 4B is a second schematic illustration 450 depicting the subsequent operations carried out by the virtual communication platform 106 to deliver the data received from the trunking service 106 to one of the customer networks 102, 104. The processes illustrated in FIGS. 4A and 4B are also represented in FIGS. 5A and 5B, which are flow charts illustrating corresponding methods 500 and 550.

Figure 5A:
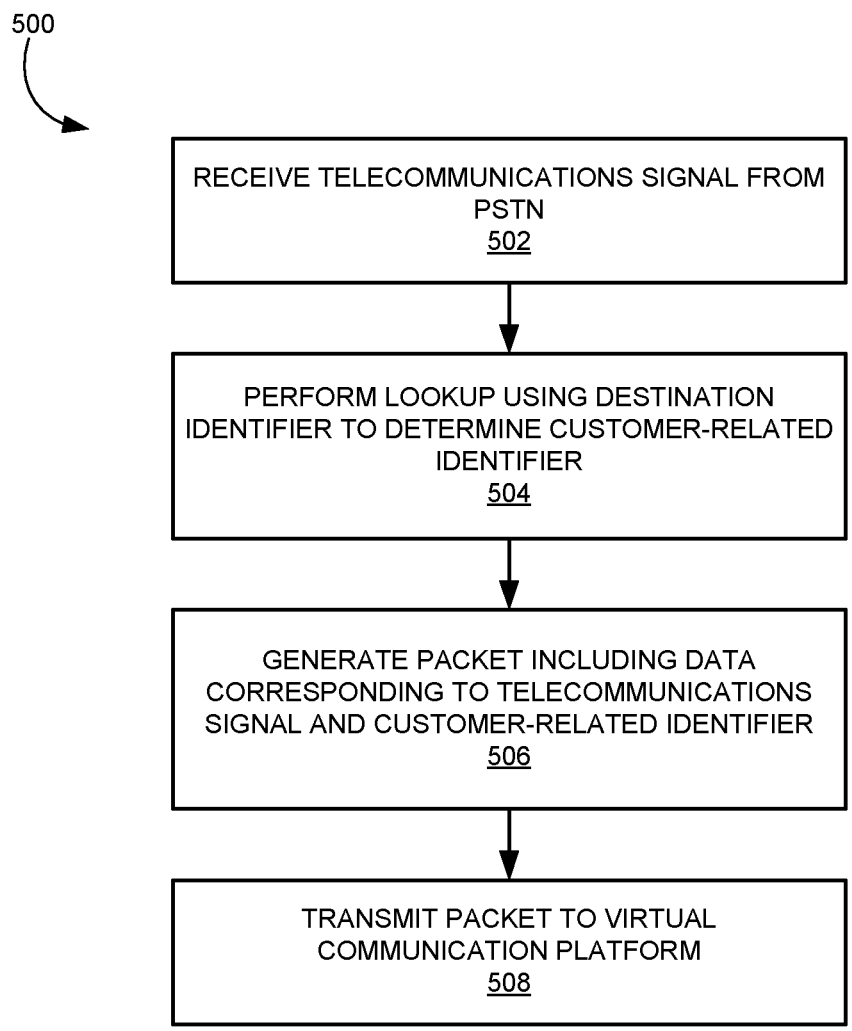
FIG. 5A is a flow chart illustrating a method for handling traffic using a trunking service and corresponding to the schematic illustration of FIG. 4A.
Figure 5B:
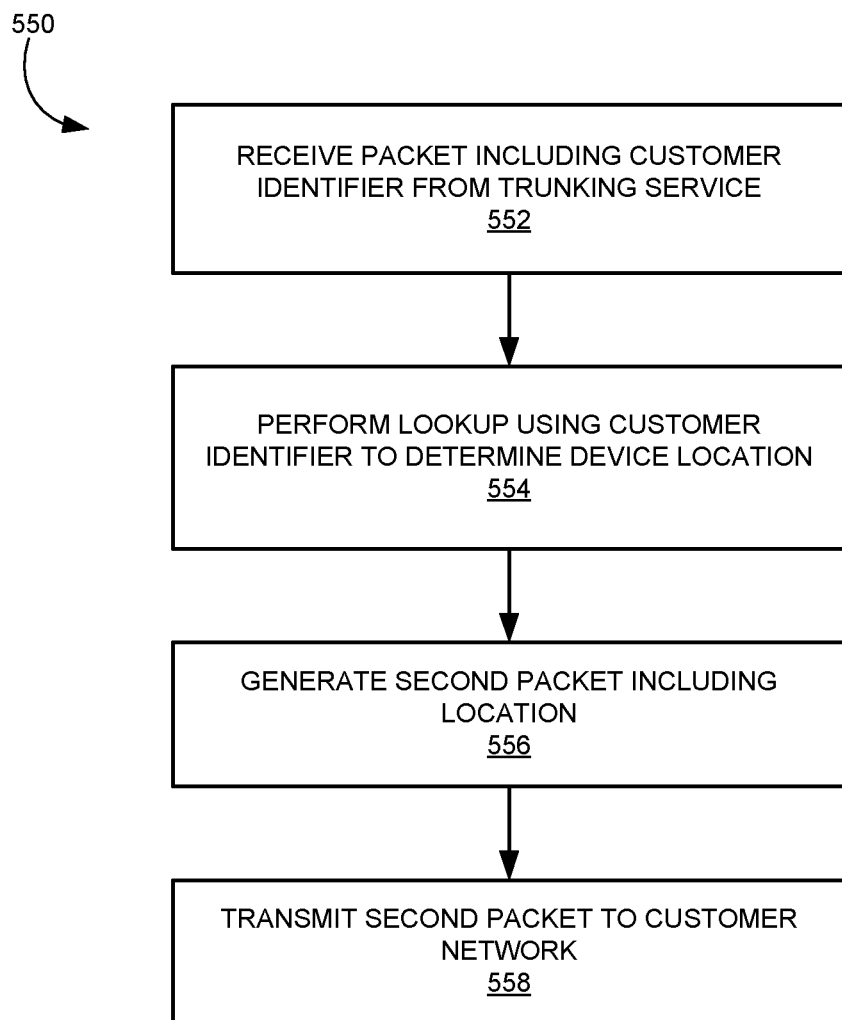
FIG. 5B is a flow chart illustrating a method for handling traffic using a virtual communication platform and corresponding to the schematic illustration of FIG. 4B.

Reference is next made to FIGS. 1, 4A, and 5A to describe the process of handling traffic received from the PSTN 150 or similar network by the trunking service 108. The process of handling such traffic begins at operation 502 with the trunking service 106 receiving a telecommunications or other signal from the PSTN 150. In general, such traffic includes a destination identifier, such as a phone number, corresponding to an intended destination of the traffic.

At operation 504, the trunking service 108 performs a lookup or similar operation using the destination identifier to determine a customer-related identifier associated with the intended destination of the received signal. For example, in certain implementations the customer-related identifier may be a unique identifier associated with one of the customer networks 102, 104 or, in certain implementations, one of the client devices 112-118, 120-126. In certain implementations, the customer-related identifier may be a combination of an identifier obtained by performing a lookup operation and data derived from the signal. For example, the customer-related identifier may be a combination of a customer network identifier and the destination identifier received as part of the signal.

At operation 506, the trunking service 108 generates a packet including data corresponding to the received signal and inserts the identifier determined during operation 504. In certain implementations, the identifier may be inserted into the header of the packet. The packet is then transmitted to the virtual communication platform 106 at operation 508.

Reference is next made to FIGS. 4B and 5B, the latter of which is a flow chart illustrating a method 550 for handling traffic received from the trunking service 108 by the virtual communication platform 106. At operation 552, the virtual communication platform 106 receives a packet, such as the packet generated in operation 504 described above in the context of FIGS. 2A and 3A, from the virtual communication platform 106.

As previously noted, the packets generated and transmitted from the trunking service 108 to the virtual communication platform 106 may generally include a data representation of the signal received by the trunking service 108 as well as an identifier. Accordingly, at operation 554, the virtual communication platform performs a lookup or similar operation using the identifier to determine a location associated with the destination for the signal received by the trunking service 108. For example, the virtual communication platform 106 may perform a lookup using the identifier in order to retrieve a public Internet protocol (IP) address, a combination of a VPN identifier and a private IP address, or a similar location corresponding to one of the client devices 112-118, 120-126.

At operation 556, the virtual communication generates a second packet including the data of the packet received from the trunking service 108 as well as the location obtained during operation 554. The process of generating the second packet may include one of generating a new packet including each of the data and the location or may include replacing the identifier of the packet received from the trunking service 108 or otherwise inserting the location into the packet received from the trunking service 108. Following generation of the second packet, the virtual communication platform 106 transmits the second packet to the appropriate customer network based on the location information.

Figure 6:
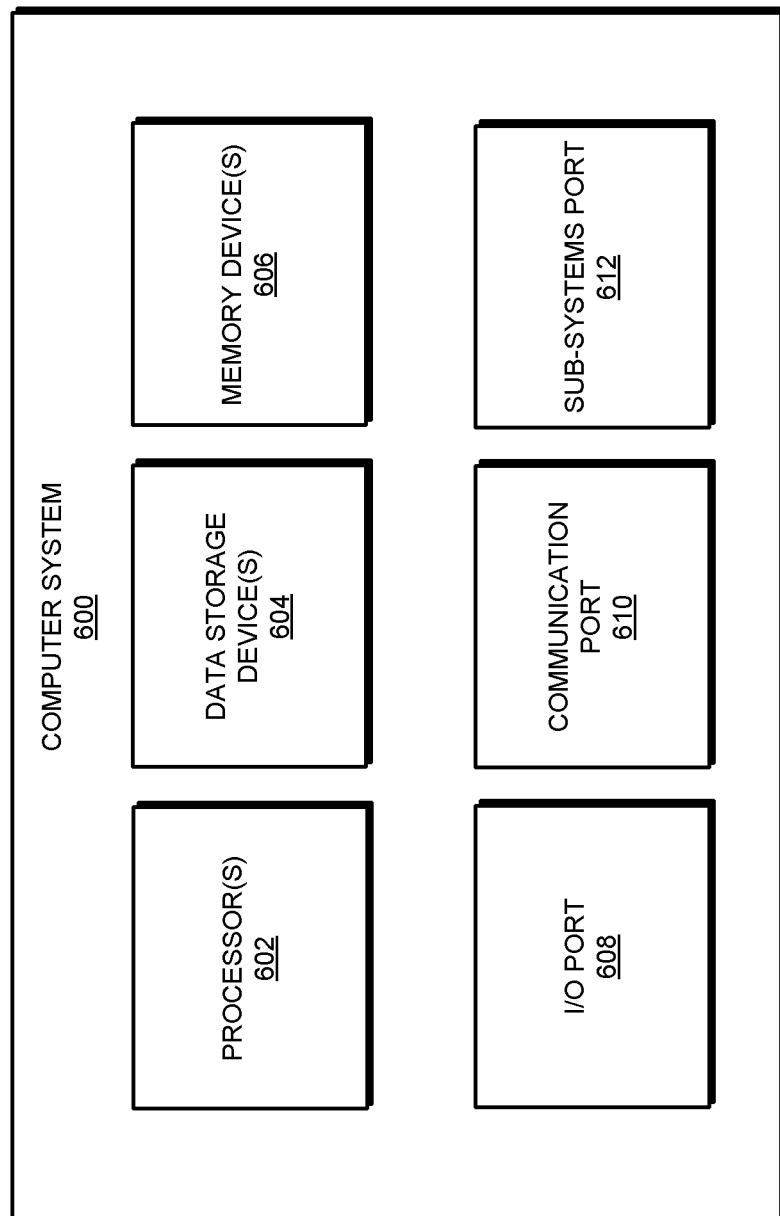
FIG. 6 is an example computing system that may implement various systems and methods of the presently disclosed technology.

Referring to FIG. 6, a schematic illustration of an example computing system 600 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 600 may be a computing system capable of executing a computer program product to execute a computer process. Data and program files may be input to computer system 600, which reads the files and executes the programs therein. Some of the elements of the computer system 600 are shown in FIG. 6, including one or more hardware processors 602, one or more data storage devices 604, one or more memory devices 608, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 includes a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on data storage device(s) 604, stored on memory device(s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

One or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. Data storage devices 604 may include, without limitation, magnetic disk drives, optical disk drives, solid state drives (SSDs), flash drives, and the like. Data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from the computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna for electromagnetic signal transmission and/or reception.

The computer system 600 may include a sub-systems port 612 for communicating with one or more other systems with which the computer system 600 interacts and/or communicates. For example, the computer system 600 may be implemented in a vehicle and may be coupled by the sub-systems port 612 to one or more subsystems that control operations of the vehicle and/or to otherwise facilitate exchange of information between the computer system 600 and the one or more sub-systems of the vehicle. In the context of a vehicle, examples of such sub-systems include, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

Numerous examples are provided herein to enhance understanding of the present disclosure. A specific set of statements are provided as follows. Such statements are intended merely as examples of potential implementations of the present disclosure and should not be viewed as limiting the scope of the disclosure.

Statement 1: A method of transferring traffic between networks, the method including receiving a packet from a first network element of a first network, the packet including data originating from a second network element communicatively coupled to the first network element and an identifier associated with the second network element, the identifier inserted into the packet by the first network element; identifying a service attribute associated with the second network element based on the identifier; converting the data for transmission over a second network; and transmitting the converted data over the second network in accordance with the service attribute, wherein the first network element at least partially implements a virtual communication platform hosting a plurality of communication services, the plurality of communication services including a communication service associated with the second network element and through which the data originating from the second network is received by the virtual communication platform.

Statement 2: The method of Statement 1, wherein each of the plurality of communication services is one of a virtual private branch exchange (PBX) service or a unified communications and collaboration service.

Statement 3: The method of Statement 1, wherein the service attribute corresponds to at least one of billing functions, line usage tracking functions, or quality of service functions.

Statement 4: The method of Statement 1, wherein the packet is received by a third network element and the third network element converts the data for transmission over the second network.

Statement 5: The method of Statement 4, wherein at least one of the first network element, the second network element, or the third network element is a session border controller.

Statement 6: The method of Statement 4, wherein the second network is a telecommunications network and the third network element receives the packet from the first network element over a session initiation protocol (SIP) trunk, converts the data into a signal compatible with the second network, and transmits the converted data over the second network in accordance with the service attribute.

Statement 7: The method of Statement 1, wherein the packet is a session initiation protocol (SIP) packet including a header and the identifier is inserted into the header by the first network element.

Statement 8: A method of transferring traffic between networks including receiving, at a first network element, a telecommunications signal including a destination identifier corresponding to a second network element; retrieving, based on the destination identifier, an identifier corresponding to the second network element; generating a packet from the signal; inserting the identifier into the packet; and transmitting the packet with the identifier to a third network element communicatively coupled to the second network element, wherein the third network element at least partially implements a virtual communication platform hosting a plurality of communication services, the plurality of communication services including a communication service associated with the second network element through which communications received by the virtual communication platform are provided to the second network element.

Statement 9: The method of Statement 8, wherein each of the plurality of communication services is one of a virtual private branch exchange (PBX) service or a unified communications and collaboration service.

Statement 10: The method of Statement 8, wherein the identifier corresponding to the second network element includes at least one of a public Internet protocol (IP) address or a combination of a private IP address and a virtual private network (VPN) identifier.

Statement 11: The method of Statement 8, wherein the first network element is communicatively coupled to the third network element by a session initiation protocol (SIP) trunk and the first network element at least partially implements a trunking service.

Statement 12: The method of Statement 8, wherein at least one of the first network element, the second network element, or the third network element is a session border controller.

Statement 13: The method of Statement 8, wherein the telecommunications signal is a PSTN-compatible signal.

Statement 14: The method of Statement 8, wherein the packet includes a header and inserting the identifier includes inserting the identifier into the header.

Statement 15: The method of Statement 8, wherein the destination identifier is a phone number assigned to the second network element or a device communicatively coupled to the second network element.

Statement 16: A system for transferring traffic between networks including a first network element communicatively coupleable to a second network element over a first network, the first network element including one or more processors in communication with one or more memories, the one or more memories including instructions that, when executed by the one or more processors, cause the one or more processors to: receive a packet from the second network element, the packet including data originating from a third network element communicatively coupled to the second network element and an identifier associated with the third network element, the identifier inserted into the packet by the second network element; identify a service attribute associated with the third network element based on the identifier; convert the data for transmission over a second network; and transmit the converted data over the second network in accordance with the service attribute, wherein the second network element at least partially implements a virtual communication platform hosting a plurality of communication services, the plurality of communication services including a communication service associated with the third network element and through which the data originating from the third network is received by the virtual communication platform.

Statement 17: The system of Statement 16, wherein each of the plurality of communication services is one of a private branch exchange (PBX) service or a unified communications and collaboration service.

Statement 18: The system of Statement 16, wherein the service attribute corresponds to at least one of billing functions, line usage tracking functions, or quality of service functions.

Statement 19: The system of Statement 16, wherein the first network element is a session border controller for exchanging data between the first network and the second network.

Statement 20: The system of Statement 16, wherein the packet is a session initiation protocol (SIP) packet including a header and the identifier is inserted into the header by the second network element.

Statement 21: A system for transferring traffic between networks including a first network element communicatively coupleable to a second network element that at least partially implements a virtual communication platform, the first network element including one or more processors in communication with one or more memories, the one or more memories including instructions that, when executed by the one or more processors, cause the one or more processors to: receive a telecommunications signal including a destination identifier corresponding to a third network element associated with a communication service; retrieve, based on the destination identifier, an identifier corresponding to the third network element; generate a packet from the signal; insert the identifier into the packet; and transmit the second packet including the identifier to the second network element, wherein the communication service associated with the third network element is one of a plurality of communication services hosted by the virtual communication platform.

Statement 22: The system of Statement 21, wherein each of the plurality of communication services is one of a virtual private branch exchange (PBX) or a unified communications and collaboration service.

Statement 23: The system of Statement 21, wherein the identifier corresponding to the second network element includes at least one of a public Internet protocol (IP) address or a combination of a private IP address and a virtual private network (VPN) identifier.

Statement 24: The system of Statement 21, wherein the first network element is communicatively coupleable to the second network element by a session initiation protocol (SIP) trunk and at least partially implements a trunking service.

Statement 25: The system of Statement 21, wherein the packet includes a header and the identifier is inserted into the header of the packet.

Statement 26: A method of transferring traffic between networks including receiving, at a first network element, a first packet including one or more attributes associated with a second network element communicatively coupled to the first network element; obtaining, based on the one or more attributes, an identifier associated with the second network element; generating a second packet including the identifier; and transmitting the second packet to a third network element, wherein the first network element at least partially implements a virtual communication platform hosting a plurality of communication services, the plurality of communication services including a communication service associated with the second network element and through which the first packet is received by the virtual communication platform.

Statement 27: The method of Statement 26, wherein the third network element at least partially implements a trunking service and the first network element and the third network element are communicatively coupled by a session initiation protocol (SIP) trunk.

Statement 28: The method of Statement 26, wherein at least one of the first packet or the second packet is a SIP packet.

Statement 29: The method of Statement 26, wherein each of the plurality of communications services is one of a cloud-based PBX or a unified communications and collaboration platform.

Statement 30: The method of Statement 26, wherein generating the second packet includes inserting the identifier into a header of the second packet.

Statement 31. The method of Statement 26, wherein the one or more attributes include at least one of a public Internet protocol (IP) address or a combination of a private IP address and a virtual private network (VPN) identifier, the one or more attributes being uniquely assigned to the second network element or a device communicatively coupled to the second network element and also associated with the communication service.

Statement 32: A method of transferring traffic between networks including receiving, at a first network element, a first packet generated by a second network element in response to the second network element receiving a telecommunications signal, the first packet including an identifier associated with a third network element in communication with the first network element; retrieving, using the identifier, a location of the third network element; generating a second packet including the location; and transmitting the second packet to the third network element according to the location; wherein the first network element at least partially implements a virtual communication platform hosting a plurality of communication services, the plurality of communication services including a communication service include the third network element, the third network element in communication with the first network element through the communication service.

Statement 33: The method of Statement 32, wherein the second network element at least partially implements a trunking service and the first network element and the second network element are communicatively coupled by a session initiation protocol (SIP) trunk.

Statement 34: The method of Statement 32, wherein at least one of the first packet or the second packet is a SIP packet.

Statement 35. The method of Statement 32, wherein the location is inserted by the first network element into a header of the second packet.

Statement 36: The method of Statement 32, wherein the location includes at least one of a public Internet protocol (IP) address or a combination of a private IP address and a virtual private network (VPN) identifier.

Statement 37: A system for transferring traffic between networks including a first network element communicatively coupleable to each of a second network element and a third network element, the first network element including one or more processors in communication with one or more memories, the one or more memories including instructions that, when executed by the one or more processors, cause the one or more processors to: receive, from the second network element, a first packet including one or more attributes associated with the second network element; obtain, based on the one or more attributes, an identifier associated with the second network element; generating a second packet including the identifier; and transmit the second packet including the identifier to the third network element, wherein the first network element at least partially implements a virtual communication platform hosting a plurality of communication services, the plurality of communication services including a communication service associated with the second network element and through which the packet is received by the virtual communication platform.

Statement 38: The system of Statement 37, wherein at least one of the first packet or the second packet is a session initiation protocol (SIP) packet.

Statement 39: The system of Statement 37, wherein at least one of the first packet or the second packet is a SIP packet.

Statement 40: The system of Statement 37, wherein generating the second packet includes inserting the identifier into a header of the second packet.

Statement 41: The system of Statement 37, wherein the wherein the one or more attributes include at least one of a public Internet protocol (IP) address or a combination of a private IP address and a virtual private network (VPN) identifier, the one or more attributes being uniquely assigned to the second network element or a device communicatively coupled to the second network element and also associated with the communication service.

Statement 42: A system for transferring traffic between networks including a first network element communicatively coupleable to each of a second network element and a third network element, the first network element including one or more processors in communication with one or more memories, the one or more memories including instructions that, when executed by the one or more processors, cause the one or more processors to: receive a first packet generated by the second network element in response to the second network element receiving a telecommunications signal, the first packet including an identifier associated with the third network element; retrieve, using the identifier, a location of the third network element; generate as second packet including the location; and transmit the packet to the third network element according to the location, wherein the first network element corresponds to a virtual communication platform hosting a plurality of communication services, the plurality of communication services including a communication service including the third network element, the third network element in communication with the first network element through the communication service.

Statement 43: The system of Statement 42, wherein the second network element at least partially implements a trunking service and the first network element is communicatively coupleable to the second network element by a session initiation protocol (SIP) trunk.

Statement 44. The system of Statement 42, wherein generating the second packet includes inserting the location into a header of the second packet.

Statement 45. The system of Statement 42, wherein the location includes at least one of a public Internet protocol (IP) address or a combination of a private IP address and a virtual private network (VPN) identifier.

We claim:

1. A method of transferring traffic between networks comprising:
   receiving a packet from a first network element, the packet including data originating from a second network element;
   identifying a service attribute associated with the second network element;
   converting the data for transmission over a second network; and
   transmitting the converted data over the second network in accordance with the service attribute,
   wherein the first network element at least partially implements a virtual communication platform hosting a plurality of communication services, the plurality of communication services including a communication service associated with the second network element.

2. The method of claim 1, wherein each of the plurality of communication services is one of a virtual private branch exchange (PBX) service or a unified communications and collaboration service.

3. The method of claim 1, wherein the service attribute corresponds to at least one of billing functions, line usage tracking functions, or quality of service functions.

4. The method of claim 1, wherein the packet is received by a third network element and the third network element converts the data for transmission over the second network.

5. The method of claim 4, wherein at least one of the first network element, the second network element, or the third network element is a session border controller.

6. The method of claim 4, wherein the second network is a telecommunications network and the third network element receives the packet from the first network element over a session initiation protocol (SIP) trunk, converts the data into a signal compatible with the second network, and transmits the converted data over the second network in accordance with the service attribute.

7. The method of claim 1, wherein the packet is a session initiation protocol (SIP) packet including a header and the identifier is inserted into the header by the first network element.

8. A method of transferring traffic between networks comprising:
   receiving, at a first network element, a telecommunications signal;
   retrieving an identifier corresponding to a second network element;
   generating a packet from the signal;
   inserting the identifier into the packet; and
   transmitting the packet with the identifier to a third network element,
   wherein the third network element at least partially implements a virtual communication platform hosting a plurality of communication services, the plurality of communication services including a communication service associated with the second network element.

9. The method of claim 8, wherein each of the plurality of communication services is one of a virtual private branch exchange (PBX) service or a unified communications and collaboration service.

10. The method of claim 8, wherein the identifier corresponding to the second network element includes at least one of a public Internet protocol (IP) address or a combination of a private IP address and a virtual private network (VPN) identifier.

11. The method of claim 8, wherein the first network element is communicatively coupled to the third network element by a session initiation protocol (SIP) trunk and the first network element at least partially implements a trunking service.

12. The method of claim 8, wherein at least one of the first network element, the second network element, or the third network element is a session border controller.

13. The method of claim 8, wherein the telecommunications signal is a PSTN-compatible signal.

14. The method of claim 8, wherein the packet includes a header and inserting the identifier comprises inserting the identifier into the header.

15. The method of claim 8, wherein the destination identifier is a phone number assigned to the second network element or a device communicatively coupled to the second network element.

16. A system for transferring traffic between networks comprising:
   a first network element, the first network element including one or more processors in communication with one or more memories, the one or more memories including instructions that, when executed by the one or more processors, cause the one or more processors to:
   receive a packet from a second network element, the packet including data originating from a third network element and an identifier associated with the third network element, the identifier inserted into the packet by the second network element;
   identify a service attribute associated with the third network element based on the identifier;
   convert the data for transmission over a second network; and
   transmit the converted data over the second network in accordance with the service attribute,
   wherein the second network element at least partially implements a virtual communication platform hosting a plurality of communication services, the plurality of communication services including a communication service associated with the third network element.

17. The system of claim 16, wherein each of the plurality of communication services is one of a private branch exchange (PBX) service or a unified communications and collaboration service.

18. The system of claim 16, wherein the service attribute corresponds to at least one of billing functions, line usage tracking functions, or quality of service functions.

19. The system of claim 16, wherein the first network element is a session border controller for exchanging data between the first network and the second network.

20. The system of claim 16, wherein the packet is a session initiation protocol (SIP) packet including a header and the identifier is inserted into the header by the second network element.

* * * * *